(12) United States Patent
Bilkey

(10) Patent No.: US 6,890,651 B2
(45) Date of Patent: May 10, 2005

(54) **WATER- AND OIL-ABSORBENT MEDIUM COMPRISING MILLED *SPHAGNUM*, *SPHAGNUM MOSS*, AND/OR *SPHAGNUM* PEAT**

(75) Inventor: Peter C. Bilkey, Madison, WI (US)

(73) Assignee: AgResearch International, Inc., Madison, WI (US)

( * ) Notice: Subject to any disclaimer, the term of this patent is extended or adjusted under 35 U.S.C. 154(b) by 29 days.

(21) Appl. No.: 10/411,721

(22) Filed: Apr. 11, 2003

(65) Prior Publication Data

US 2004/0161606 A1 Aug. 19, 2004

Related U.S. Application Data

(60) Provisional application No. 60/448,243, filed on Feb. 19, 2003, and provisional application No. 60/447,992, filed on Feb. 18, 2003.

(51) Int. Cl.[7] ................................................ B32B 5/66
(52) U.S. Cl. ...................... 428/402; 428/535; 428/536; 428/537.1; 604/358; 604/364; 604/367; 604/374; 604/375; 604/385.1
(58) Field of Search ................................ 428/402, 536, 428/535, 537.1; 604/358, 364, 367, 374, 375, 385.1

(56) References Cited

U.S. PATENT DOCUMENTS

| | | | | |
|---|---|---|---|---|
| 3,690,034 A | * | 9/1972 | Knapp | ......................... 47/57.6 |
| 4,215,692 A | * | 8/1980 | Levesque | ..................... 604/374 |
| 4,551,165 A | * | 11/1985 | Warner | ........................... 71/24 |
| 5,661,997 A | * | 9/1997 | Levesque et al. | .............. 73/73 |
| 5,718,697 A | * | 2/1998 | Chauvette et al. | .......... 604/367 |
| 6,555,007 B1 | * | 4/2003 | Bilkey | ........................ 210/673 |

* cited by examiner

Primary Examiner—Leszek B Kiliman
(74) Attorney, Agent, or Firm—George L. Boller

(57) ABSTRACT

*Sphagnum, sphagnum moss,* and/or *sphagnum* peat is milled to create a multitude of *sphagnum, sphagnum moss,* and/or *sphagnum* peat particles substantially all of which have a size less than about 850 microns. Particles of milled *sphagnum moss* have been shown to retain excellent water and oil absorption capabilities until particle sizes become smaller than 180 microns.

21 Claims, 1 Drawing Sheet

WATER- AND OIL-ABSORBENT MEDIUM COMPRISING MILLED *SPHAGNUM*, *SPHAGNUM MOSS*, AND/OR *SPHAGNUM* PEAT

REFERENCE TO RELATED APPLICATIONS AND PRIORITY CLAIMS

This non-provisional patent application claims the priority of the following commonly owned co-pending patent applications of the same inventor bearing the same title: provisional applications Ser. No. 60/447,992, filed 18 Feb. 2003, and Ser. No. 60/448,243, filed 19 Feb. 2003.

FIELD OF THE INVENTION

This invention relates to novel products and methods resulting from a certain discovery concerning the absorption capability of dried sphagnum moss.

BACKGROUND OF THE INVENTION

One aspect of the inventor's allowed U.S. patent application Ser. No. 10/078,764, filed 19 Feb. 2002, now U.S. Pat. No. 6,555,007 involves the discovery that *sphagnum*, *sphagnum moss*, and *sphagnum* peat moss can copiously bind chlorine gas. An experiment demonstrated that such organic matter could bind greater amounts of chlorine gas than activated carbon per unit weight of binding medium. Accordingly, generic aspects of that invention relate to a medium and method for binding chlorine gas comprising organic matter selected from the group consisting of *sphagnum*, *sphagnum moss*, and *sphagnum* peat moss.

U.S. patent application Ser. No. 10/078,764 describes the experimental example to involve a step in which dry *sphagnum moss* was rubbed through standard household nylon screen prior to chlorine treatment. That rubbing created a mass of particles having various sizes that would necessarily be less than the mesh size of the screen. Most of the particles were however observed to consist of relatively larger particles, i.e. particles having sizes greater than about 850 microns.

SUMMARY OF THE INVENTION

The present invention results from a further discovery made during experimental investigation of the water-and oil-absorption capability of dried *sphagnum moss*. Although the experiments were conducted on dried *sphagnum moss*, principles of the invention are considered to apply to *sphagnum*, *sphagnum moss*, and *sphagnum* peat moss.

One generic aspect of the invention relates to a mass of milled *sphagnum*, *sphagnum moss*, and/or *sphagnum* peat comprising a multitude of *sphagnum*, *sphagnum moss*, and/or *sphagnum* peat particles substantially all of which have a size less than about 850 microns.

Another generic aspect relates to a method of processing harvested organic matter from the group consisting of *sphagnum*, *sphagnum moss*, and/or *sphagnum* peat comprising performing one or more processes on the harvested organic matter to create a mass of particles of the organic matter substantially all of which have a size less than about 850 microns.

Still another generic aspect relates to a method of absorbing fluid that comprises providing a mass of sphagnum, *sphagnum moss*, and/or *sphagnum* peat substantially all of which have a size less than about 850 microns, and placing the mass in contact with a fluid to be absorbed.

Still another generic aspect relates to a method of making multiple masses of milled *sphagnum*, *sphagnum moss*, and/ or *sphagnum* peat, each mass comprising a multitude of *sphagnum*, *sphagnum moss*, and/or *sphagnum* peat particles. The method comprises milling harvested *sphagnum*, *sphagnum moss*, and/or *sphagnum* peat and separating the milled particles into multiple masses each having particles within a certain size range.

DETAILED DESCRIPTION OF THE INVENTION

Figure 1:
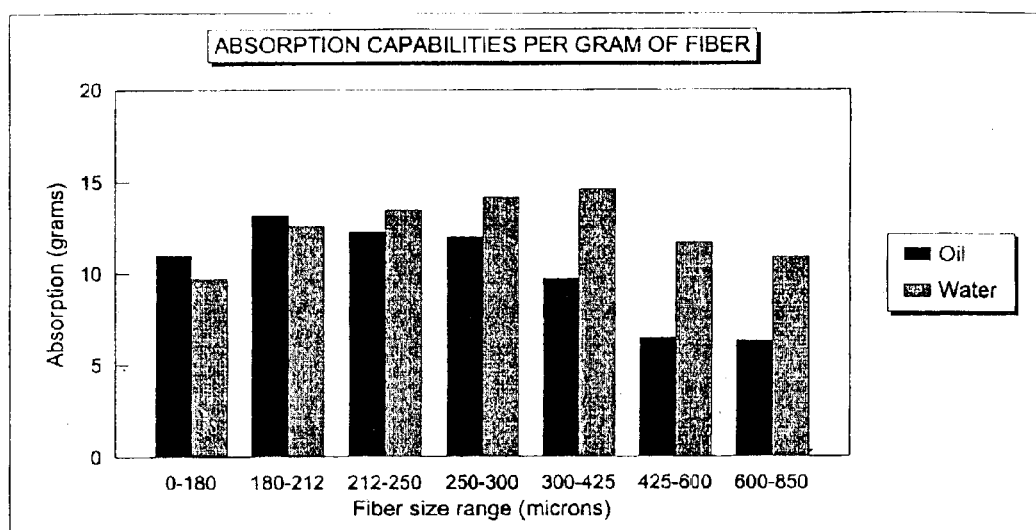
FIG. 1 is a bar graph of experimental results showing water and oil absorption capabilities of dried sphagnum particles for particles sizes in each of seven size ranges.

The present invention is the result of a new discovery involving further experimental investigation of the water- and oil-absorption capability of dried *sphagnum moss*.

As used herein the term *sphagnum* includes all species of living plants within the genus *sphagnum* whether naturally growing or cultivated. *Sphagnum moss* includes *sphagnum* that has been harvested, regardless of whether it has been subjected to further processing such as milling. *Sphagnum* peat moss includes partially decomposed sphagnum and/or partially decomposed *sphagnum moss*. Although the experiment that forms the basis for this invention was conducted on commercially available dried *sphagnum moss*, principles are considered to extend to sphagnum and *sphagnum* peat moss as well.

It has long been known that commercially available dried *sphagnum moss*, whether entire (i.e. as harvested, dried, and packed), or milled (i.e. fibers that have been reduced in size by post-harvesting man-made processes that include, but are not limited to, heat drying, pulverizing, cutting, milling), exhibits excellent water and oil absorption properties. Generally speaking, milling of the fibers creates a milled product that comprises particles of fiber that, by weight, are relatively large in size, i.e. particle size mostly greater than 850 microns.

The inventor's further work involves an investigation of the water- and oil-absorption property of milled *sphagnum* particles having sizes smaller than 850 microns. The purpose of the experiment was to determine *sphagnum*'s ability to retain its excellent water and oil absorption properties following progressively finer fiber milling. In light of the known fact that cotton fibers (which when unmilled are very good absorbers) are prone to rapidly lose their absorptive potential as they are more finely milled, the results of the inventor's experimentation on dried *sphagnum moss* appear quite surprising.

THE EXPERIMENT

Fiber Preparation: Commercially available, premium, long-fibered, dried sphagnum moss (source: Mosser Lee Division of Deli, Inc.) was used as an example of an unmilled product. The product was first cleaned by hand to remove foreign substances such as leaves, twigs, etc. It was then rinsed three times with deionized water to remove foreign substances such as sand and other small particles. Finally it was air dried.

The air-dried, cleaned unmilled *sphagnum* was then rubbed through conventional household screening to yield a milled product similar to commercially available (uncleaned) "milled *sphagnum moss*". The screened product was then further milled in a Willey mill and subjected to proper separation using commercially available laboratory screens of known mesh sizes to create seven separate masses, each of which was composed of particles substantially all of which had sizes falling within a corresponding range of sizes. Those size ranges are shown in the accompanying bar graph entitled "Absorption Capabilities Per Gram Of Fiber".

Water And Oil Absorption Measurements: Fiber absorption was measured within cotton-plugged, conventional glass pipettes. Half of the cotton-plugged pipettes were filled with deionized water; the remainder with canola cooking oil. All were then allowed to drain for at least one hour, and then initially weighed. Each weighed pipette was then filled with a fiber treatment sample from a respective one of the seven masses, and re-weighed. Each of the samples was then oversaturated with the same fluid as before (i.e. either deionized water or canola cooking oil), and allowed to drain for at least one hour before a final weighing.

Each individual fiber treatment sample had three replicates. Absorption of each fiber treatment sample was calculated by subtracting the initial weight measurement from the final weight measurement. Absorption results were then adjusted to a uniform absorption-per-gram-of-fiber basis. The mean for each the seven sizes of treatment samples was calculated. The water and oil absorption capabilities of each of the seven size ranges are shown in the bar graph.

The results demonstrate that water absorption remained high despite a significant decrease in fiber particle size. Only below 180 microns did water absorption drop below the initial absorption capability.

While oil absorption capability showed gradual increase with decrease in fiber particle size, that result may be due in some part to oil's greater viscosity and surface tension.

The experiment is considered to have resulted in the discovery that despite progressive decreases in fiber particle size, dried sphagnum moss retains excellent water and oil absorption capabilities until particle sizes become smaller than 180 microns. This discovery in turn provides a basic foundation for new inventions, namely providing a basis for new uses of milled *sphagnum, sphagnum moss*, and *sphagnum* peat to create new improvements in known products. Products not heretofore known may also be based on this discovery.

A basic aspect of the invention involves the creation, and ensuing use, of a mass of milled *sphagnum, sphagnum moss*, and/or *sphagnum* peat comprising a multitude of *sphagnum, sphagnum moss*, and/or *sphagnum* peat particles substantially all of which have a size less than about 850 microns.

The creation of a mass of *sphagnum, sphagnum moss*, and/or *sphagnum* peat particles having particle sizes less than about 850 microns enables the particles to be more tightly packed, if desired, in comparison to both unmilled fibers and the larger-sized particles that are produced by existing commercial milling of *sphagnum moss*.

One example of a use for such a milled product is as an absorber of fluid substances such as water, oil, and chlorine in either gas or liquid phase. Another example is for separation, physical and/or chemical, of substances, such as trapping of certain solid particulates, molecules, atoms, and/or ions.

The inventor believes that a mass of *sphagnum, sphagnum moss*, and/or *sphagnum* peat particles whose sizes do not exceed substantially 300 microns possesses a characteristic that can provide a basis for new products where sensory feel is an important consideration in use of such products. In particular, the inventor considers a mass of particles whose sizes do not exceed substantially 300 microns to have a smooth, non-gritty feel when applied to human skin. Accordingly, one use for such a mass of particles is in certain topical treatment compositions.

Additional uses of the basic product of the invention involve various medicinal and non-medicinal treatment products, for a living body, such as the human body. Certain products are intended for topical application; others are intended for internal application. Certain treatment products may benefit by having particles whose sizes do not exceed about 300 microns.

Commercial practice of the invention will involve performing one or more processes on harvested sphagnum, *sphagnum moss*, and/or *sphagnum* peat moss. Representative processes include cleaning, drying, and milling steps. Milled particles of the sizes falling within the scope of the invention may result directly from the milling step. Alternatively, the desired particle size may result from one or more screening steps after milling. The milled particles may be separated into masses each of which has particles within a particular size range.

While a presently preferred embodiment has been illustrated and described, it is to be appreciated that the invention may be practiced in various forms within the scope of the following claims.

What is claimed is:

1. A mass of milled *sphagnum, sphagnum moss*, and/or *sphagnum* peat comprising a multitude of dry *sphagnum*, dry *sphagnum moss*, and/or dry *sphagnum* peat particles substantially all of which have a size less than about 850 microns.

2. A mass of milled *sphagnum, sphagnum moss*, and/or *sphagnum* peat as set forth in claim 1 wherein substantially all of the particles have a size less than about 300 microns.

3. A mass of milled *sphagnum, sphagnum moss*, and/or *sphagnum* peat as set forth in claim 2 wherein the particles are essentially exclusively milled *sphagnum moss* particles.

4. A mass of milled *sphagnum, sphagnum moss*, and/or *sphagnum* peat as set forth in claim 2 wherein the particles are a mixture of two or more of the group consisting of *sphagnum, sphagnum moss*, and *sphagnum* peat.

5. A mass of milled *sphagnum, sphagnum moss*, and/or *sphagnum* peat as set forth in claim 1 wherein the particles are essentially exclusively milled *sphagnum moss* particles.

6. A mass of milled *sphagnum, sphagnum moss*, and/or *sphagnum* peat as set forth in claim 1 wherein the particles are a mixture of two or more of the group consisting of *sphagnum, sphagnum moss*, and *sphagnum* peat.

7. A method of processing harvested organic matter from the group consisting of *sphagnum, sphagnum moss*, and/or *sphagnum* peat comprising performing one or more processes on the harvested organic matter to create a mass of dry particles of the organic matter substantially all of which have a size less than about 850 microns.

8. A method as set forth in claim 7 wherein the step of performing one or more processes on the harvested organic matter comprises cleaning, drying, and milling steps.

9. A method as set forth in claim 8 wherein the milling step itself directly yields the mass of particles substantially all of which have a size less than about 850 microns.

10. A method as set forth in claim 9 wherein the milling step itself directly yields a mass of particles substantially all of which have a size less than about 300 microns.

11. A method as set forth in claim 8 including a further step of screening particles resulting from the milling step by size to yield the mass of particles substantially all of which have a size less than about 850 microns.

12. A method as set forth in claim 11 including a further step of screening particles resulting from the milling step by size to yield a mass of particles substantially all of which have a size less than about 300 microns.

13. A method of absorbing fluid that comprises:

providing a dry mass of *sphagnum, sphagnum moss,* and/or *sphagnum* peat substantially all of which have a size less than about 850 microns; and placing the dry mass in contact with a fluid to be absorbed.

14. A method as set forth in claim 13 wherein the step of placing the dry mass in contact with a fluid to be absorbed comprises placing the dry mass in contact with a gaseous fluid.

15. A method as set forth in claim 13 wherein the step of placing the dry mass in contact with a fluid to be absorbed comprises placing the dry mass in contact with a non-gaseous fluid.

16. A method of making multiple dry masses of milled *sphagnum, sphagnum moss,* and/or *sphagnum* peat, each mass comprising a multitude of *sphagnum, sphagnum moss,* and/or *sphagnum* peat particles, the method comprising first drying and the milling harvested *sphagnum, sphagnum moss,* and/or *sphagnum* peat and separating the milled particles into multiple masses each having particles within a certain size range.

17. A method as set forth in claim 16 wherein the step of separating the milled particles into multiple masses each having particles within a certain size range comprises successively screening the milled particles to create the multiple masses.

18. A mass of milled *sphagnum, sphagnum moss,* and/or *sphagnum* peat as set forth in claim 1 wherein substantially all of the particles have a size greater than about 180 microns.

19. A mass of milled *sphagnum, sphagnum moss,* and/or *sphagnum* peat as set forth in claim 2 wherein substantially all of the particles have a size greater than about 180 microns.

20. A method of making an absorbent product, the method comprising processing harvested organic matter from the group consisting of *sphagnum, sphagnum moss,* and/or *sphagnum* peat performing one or more processes on the harvested organic matter, including a drying process and thereafter a milling process, to create a mass of dry particles of the organic matter substantially all of which have a size less than about 850 microns, and then incorporating dry particles from the mass into the absorbent product.

21. The absorbent product made by the method of claim 20.

* * * * *